US012610110B2

(12) United States Patent
Martch et al.

(10) Patent No.: US 12,610,110 B2
(45) Date of Patent: Apr. 21, 2026

(54) REMOTE APPLICATION CONTROLLER

(71) Applicant: DISH Network L.L.C., Englewood, CO (US)

(72) Inventors: Henry Gregg Martch, Englewood, CO (US); Bryan Mcelhinney, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 148 days.

(21) Appl. No.: 17/444,292

(22) Filed: Aug. 3, 2021

(65) Prior Publication Data

US 2023/0038101 A1     Feb. 9, 2023

(51) Int. Cl.
| | |
|---|---|
| *H04N 21/6377* | (2011.01) |
| *H04N 21/41* | (2011.01) |
| *H04N 21/422* | (2011.01) |
| *H04N 21/6375* | (2011.01) |

(52) U.S. Cl.
CPC ... *H04N 21/6377* (2013.01); *H04N 21/41265* (2020.08); *H04N 21/42221* (2013.01); *H04N 21/6375* (2013.01)

(58) Field of Classification Search
CPC ......... H04N 21/6377; H04N 21/41265; H04N 21/42221; H04N 21/6375
See application file for complete search history.

(56) References Cited

U.S. PATENT DOCUMENTS

| | | | | |
|---|---|---|---|---|
| 7,814,516 B2 * | 10/2010 | Stecyk | ................ | H04L 12/2805 |
| | | | | 348/731 |
| 8,793,303 B2 * | 7/2014 | Speicher | ............. | H04L 12/2814 |
| | | | | 709/203 |
| 9,294,705 B2 * | 3/2016 | Black | ................. | H04N 21/6547 |
| 10,595,073 B2 * | 3/2020 | Ashraf | .................... | G06F 3/167 |
| 11,924,497 B2 * | 3/2024 | Vishwanath | ..... | H04N 21/42222 |
| 2006/0156353 A1 * | 7/2006 | Dorner | .............. | H04N 21/4325 |
| | | | | 725/86 |
| 2008/0231595 A1 * | 9/2008 | Krantz | ................. | H04N 21/482 |
| | | | | 345/156 |
| 2012/0081299 A1 * | 4/2012 | Xiao | ................ | H04N 21/42208 |
| | | | | 345/173 |
| 2012/0249890 A1 * | 10/2012 | Chardon | .......... | H04N 21/43635 |
| | | | | 348/734 |
| 2014/0132844 A1 * | 5/2014 | Burns | .............. | H04N 21/43635 |
| | | | | 348/734 |

(Continued)

FOREIGN PATENT DOCUMENTS

EP          4529186 A1 *  3/2025  ............. G08C 23/04

*Primary Examiner* — Benjamin R Bruckart
(74) *Attorney, Agent, or Firm* — KW Law, LLP

(57)          ABSTRACT
A device for remote controlling an application on a display device including a user interface for receiving a user input, a transmitter for transmitting a control signal to a display device, a network interface for coupling the control signal to a wireless local area network, and a processor for generating the control signal in response to the user input, determining a destination for the control signal in response to the user input, for coupling the control signal to the transmitter in response to the destination being a display device remote control receiver and for coupling the control signal to the network interface in response to the destination being a display device network interface.

11 Claims, 6 Drawing Sheets

180

(56) References Cited

U.S. PATENT DOCUMENTS

| 2014/0186007 | A1* | 7/2014 | Keys | ................. | H04N 21/4223 |
| | | | | | 386/234 |
| 2015/0172780 | A1* | 6/2015 | Soundararajan | ........................... | |
| | | | | | H04N 21/41407 |
| | | | | | 725/32 |
| 2015/0334442 | A1* | 11/2015 | Charania | ............ | H04N 21/4821 |
| | | | | | 725/44 |
| 2017/0244779 | A1* | 8/2017 | Reichling | ........... | G06F 3/04842 |
| 2017/0277373 | A1* | 9/2017 | Jeong | .................. | H05B 47/105 |
| 2020/0014974 | A1* | 1/2020 | Patel | ................ | H04N 21/43615 |
| 2020/0275225 | A1* | 8/2020 | Proctor, Jr. | ........ | H04N 21/8106 |
| 2021/0289262 | A1* | 9/2021 | O'Connor | .......... | H04N 21/4667 |
| 2022/0116674 | A1* | 4/2022 | Vishwanath | ....... | H04N 21/4331 |
| 2022/0150568 | A1* | 5/2022 | Kaemmerer | ....... | H04N 21/2747 |
| 2022/0321949 | A1* | 10/2022 | Jung | ............... | H04N 21/43615 |

* cited by examiner

<u>200</u>

300

400

500

REMOTE APPLICATION CONTROLLER

TECHNICAL FIELD

The following discussion generally relates to a remote control for controlling an application on an electronic device. More particularly, the following discussion relates to a wireless controller coupled to a network for generating and receiving commands for control of an application on a network display device.

BACKGROUND

Consumer electronics are moving away from dedicated hardware platforms and towards software applications on host platforms, such as smart TVs, set top boxes, smartphones or other display devices. Hardware platforms for consumer premises are limited by their hardware configuration. It can be difficult to upgrade or reconfigure a dedicated hardware platform at a consumer's residence and eventually, the increasing demands of additional software features and limited memory and processor speeds render the dedicated hardware obsolete. At this time, the hardware platform must be replaced by the consumer and/or the service provider. In addition, hardware platforms may have security measures which may be breached by hardware modification and updating the device to counter these security breaches may be difficult or impossible. Software applications provide increased flexibility and upgradability.

Set top boxes are one form of hardware platform that is typically connected to a television or other display device for providing audio/video programming, gaming applications, and other infotainment programs to a user. Gaming consoles are another form of set top box. Typically, these set top boxes come with a remote controller which is configured to provide optimized access to the software applications on the set top box for a user. For example, a gaming console may include a joystick and a number of buttons to allow a user to easily play a game. Likewise, audio/video system controllers may include menu and chapter buttons, fast forward and rewind, ratings buttons, shortcut buttons and the like that are designed to provide a user with optimal access to the audio/video content and other features. Recently, the use of dedicated hardware platforms is being reduced in favor of software applications that may reside directly on a display, such as a computer or a smart TV. These applications can be directly downloaded to the display by a user or may come preinstalled. A problem arises in that a user must then interact with the application using a remote controller supplied with the display device. In some instances, these remote controllers may not be sufficient to allow a user to properly interact with the software application. Likewise, each display device provider will have a differently configured remote control which makes interaction with the software application inconsistent. It would be desirable to overcome these problems to facilitate a consistent user interaction with an installed software program. Other desirable features and characteristics will become apparent from the subsequent detailed description and the appended claims, taken in conjunction with the accompanying drawings and this background section.

BRIEF SUMMARY

Disclosed herein are human machine interface methods and systems and related circuitry for provisioning computational systems, methods for making and methods for operating such systems. By way of example, and not limitation, presented are various embodiments of a remote control device and system for interaction with a software application on a non-standard display device are disclosed herein.

In accordance with an aspect of the disclosure, a method of controlling an application on a display device including receiving a first user input via a user interface, generating a first control signal in response to the first user input, determining a wireless network transmission channel for the first control signal, transmitting, by a network interface, the first control signal to a display device network interface via the wireless network transmission channel, receiving a second user input via a user interface, generating a second control signal in response to the second user input, determining a wireless transmission channel for the second control signal, and transmitting, by a wireless transmitter, the second control signal to a display device wireless receiver.

In accordance with another aspect of the disclosure, a device for remote controlling an application on a display device including a user interface for receiving a user input, a transmitter for transmitting a control signal to a display device, a network interface for coupling the control signal to a wireless local area network, and a processor for generating the control signal in response to the user input, determining a destination for the control signal in response to the user input, for coupling the control signal to the transmitter in response to the destination being a display device remote control receiver and for coupling the control signal to the network interface in response to the destination being a display device network interface In accordance with another aspect of the disclosure, a remote control device including a radio frequency transmitter configured to transmit a display device control command to a display device in response to a first control signal, a network interface configured to transmit an application control command via a wireless network to a display device network interface to control an application being performed by the display device, a user interface configured to receive a first user input and a second user input, and a processor configured to generate the display device control command in response to the first user input calling for control of the display device, the processor further configured to generate the application control command in response to the second user input calling for control of the application being performed by the display device.

The above advantage and other advantages and features of the present disclosure will be apparent from the following detailed description of the preferred embodiments when taken in connection with the accompanying drawings.

BRIEF DESCRIPTION OF THE DRAWING FIGURES

The exemplary embodiments will hereinafter be described in conjunction with the following drawing figures, wherein like numerals denote like elements, and wherein.

The exemplifications set out herein illustrate preferred embodiments of the disclosure, and such exemplifications are not to be construed as limiting the scope of the disclosure in any manner.

DETAILED DESCRIPTION

The following detailed description is intended to provide various examples, but it is not intended to limit the disclosure or the application and uses of the disclosure. Furthermore, there is no intention to be bound by any theory presented in the preceding background or the following detailed description.

The general concepts described herein may be implemented in any audio/video display device or connected device that may be used for audio/video streaming or presentation to an audio/video display device or the like. For convenience of illustration, the following discussion often refers to a system and method for providing a remote controller having a plurality of user inputs, wherein the remote controller is coupled to a wireless network interface. The remote controller is configured to couple control signals to a display device coupled to the wireless network interface for control of an application installed and running on the display device. The control signals may be generated in response to user actions received at the user inputs. Additional details and examples are provided in the following description.

In some exemplary embodiments, the audio/video display device may be consumer purchased and owned and may be an open system with internet access allowing a broad number of entertainment options for third parties companies.

Figure 1:
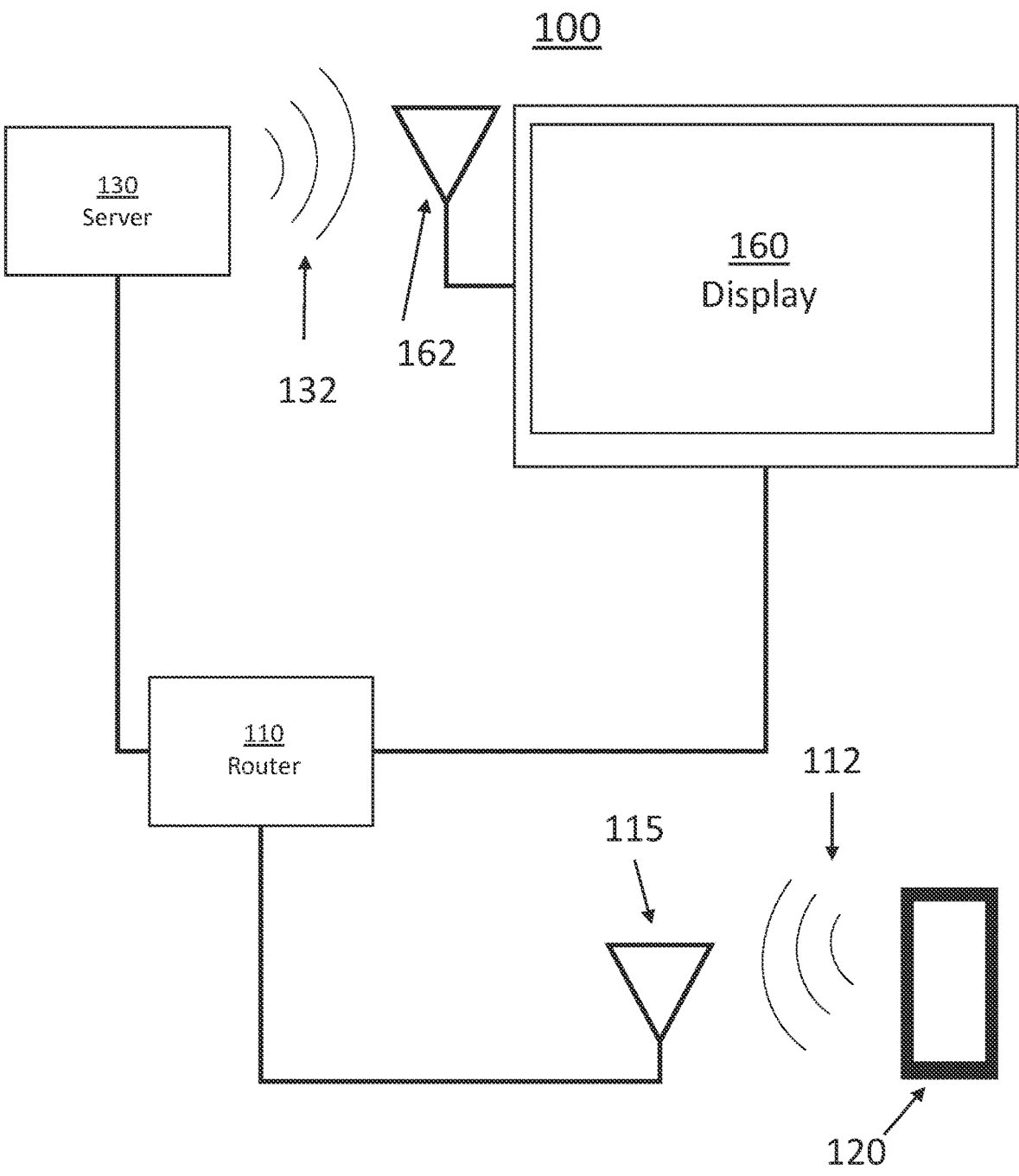
FIG. 1 shows an environment for reception of a remote control for controlling an audio/video program on a video device according to an exemplary embodiment of the present disclosure.

Turning now to FIG. 1, an environment 100 for reception of a remote control for controlling an application on a video device according to an exemplary embodiment of the present disclosure is shown. In some exemplary embodiments, the application may be an audio/video program or audio/video program streaming application. The exemplary system may include a display 160, a router 110 a server 130 an antenna 115 and a remote control 120. In this exemplary embodiment, the remote control 120 is configured to wirelessly transmit a control signal 112 to the antenna 115 coupled to the router 110. The router 110 is then configured to couple the control signal to the display 160 and/or the server 130. The display 160 may be configured to control an application running on the display 160 in response to the control signal. Alternatively, the server 130 may receive the control signal via a network, such as the internet, and generate an application control signal in response to the received control signal. The server 130 is then configured to couple to application control signal to the display 160 via the network and the router 110. The display 160 may then control the application running on the display in response to the application control signal. In some embodiments, the server 130 may translate remote control commands from the remote control 120 to platform specific commands for the application. For example, a guide command on a remote control may be translated to a guide command for a streaming application such as Dish Anywhere® and a different guide command for a Sling TV® application.

The display 160 may be any device capable of receiving or generating an audio/video program and conditioning the received audio/video program for display on a display screen, such as a television, computer with display, set top box coupled to a display or the like. The display 160 may be capable of receiving control signals via a network interface, such as via a local area network, Zigbee® RF4CE, BlueTooth® or Wi-Fi® network. The display 160 may further receive control signals from the remote control 120 via a traditional remote control interface, such as a radio frequency, Bluetooth®, or infrared transmission channel. The display 160 may be further capable of receiving control signals, application control signals, or audio/video programming signals via an antenna 162, such as a television and/or satellite antenna, or via a wired broadcast network, such as a cable television network.

The router 110 may include a wireless network interface, such as a Wi-Fi® network interface, and may be configured to transmit and receive data signals via the wireless network, local area network, and/or wide area network such as the internet. The router 110 may include one or more integrated antennas or may be coupled to an antenna 115 for receiving a wireless data signal 112. In some embodiments, the router 110 may be configured to receive data transmitted by the remote control 120 in response to a user input. In some instances, the router 110 may configure the received data for transmission via the local area network for coupling to the display 160 or the wide area network for coupling to the server 130.

The server 130 may be a data processing device operated by a service provider. The service provider may be the same service provider providing the audio/video programming to the application running on the display 160. The server 130 may be coupled to the router 110 via a wide area network such as the internet. The server 130 may be configured to receive a data signal from the remote control 120 wherein the data signal is generated in response to a user input at the remote control 120. The server 130 may then generate an application control signal in response to the data signal and couple this application control signal to the display 160 via the wide area network. In one exemplary embodiment, the control signal may be indicative of a stop play command for the audio/video program. The server 130 may then generate an application control signal indicative of the stop time and program data and couple this to the display 160. The display 160 may then stop the presentation of the audio/video program and store the stop time and program data in a memory. Alternatively, the server 130 may store the stop time and program data and generate an application control signal to restart presentation of the audio/video program at that stop time during a subsequent presentation of the audio/video program. In another embodiment, the server may transmit the application control signal to the display 160 via the broadcast signal 132, such as a satellite broadcast signal, radio frequency broadcast signal, or cable network broadcast signal.

The remote control 120 may be a battery powered electronic device configured to receive user inputs via a keypad, touchpad, gesture interface or the like and to generate a control signal in response to the user inputs. The remote control 120 may then transmit the control signal via a wireless network signal 112 on a wireless network, such as a Wi-Fi® network or Zigbee® RF4CE, to the router 110. Alternatively, the remote control 120 may transmit the control signal directly to the display 160 via an infrared, Bluetooth® or radio frequency signal.

The display 160 is configured to perform an application algorithm, such as a gaming application or an entertainment application. In some embodiments, the application algorithm is created by the same provider as the remote control 120. In some embodiments, the application algorithm is downloaded by the display 160 in response to a control signal generated by the remote control 120 where the control signal is indicative of the remote control 120 and a service provider. The display 160 is then configured to receive control signals from the remote control 120 via the previously described channels, and to provide these control signals to the application as a control input. The display 160 may also be configured to run an Application Programming Interface (API) to receive the application control signals from the router 110 and/or the server 130 and to translate these application control signals to data suitable for input to the application and/or for controlling the display audio/video characteristics, such as increasing program volume, changing display brightness or the like.

Figure 2:
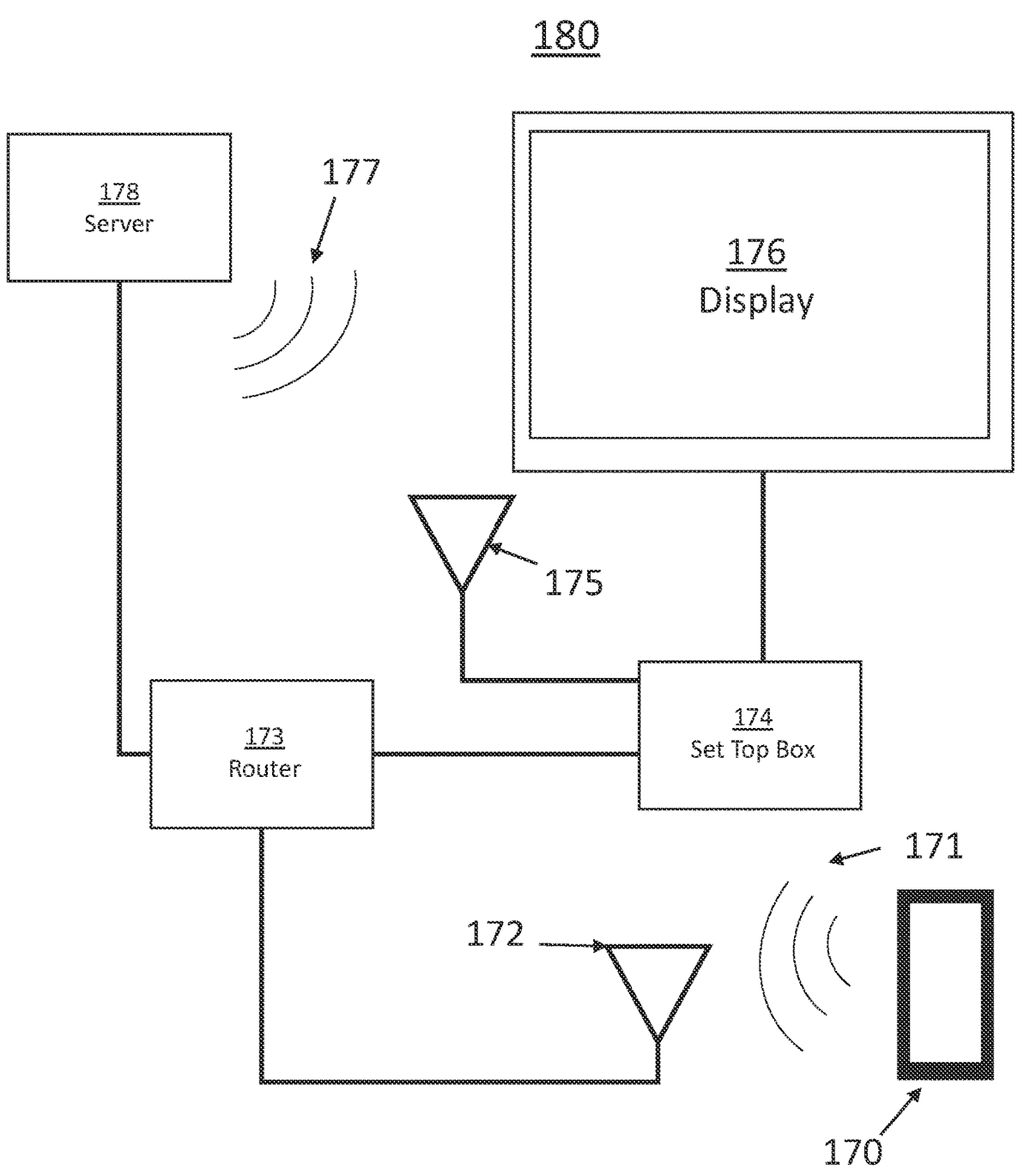
FIG. 2 shows an environment for reception of a remote control for controlling an audio/video program on a video device according to an exemplary embodiment of the present disclosure.

Turning now to FIG. 2, another exemplary environment 180 for reception of a remote control for controlling an application on a video device according to an exemplary embodiment of the present disclosure is shown. In some exemplary embodiments, the application may be an audio/video program or audio/video program streaming application. The exemplary system may include a display 176, a router 173 a server 178 an antenna 172 and a remote control 170. In this exemplary embodiment, the remote control 170 is configured to wirelessly transmit a control signal 171 to the antenna 172 coupled to the router 173. The router 173 is then configured to couple the control signal to the set top box 174 and/or the server 178. The set top box 174 may be configured to control an application running on the set top box 174 in response to the control signal. The set top box 174 may generate an audio/video signal, such as a baseband audio/video signal, to couple to a display 176 for presentation to a user.

Alternatively, the server 178 may receive the control signal via a network, such as the internet, and generate an application control signal in response to the received control signal. The server 178 is then configured to couple to application control signal to the set top box 174 via the network and the router 173. The set top box 174 may then control the application running on the set top box 174 in response to the application control signal. In some embodiments, the server 178 may transmit the control signal via a wireless transmission signal 117, such as a satellite transmission signal, to a set top box antenna 175 coupled to the set top box 174.

Figure 3:
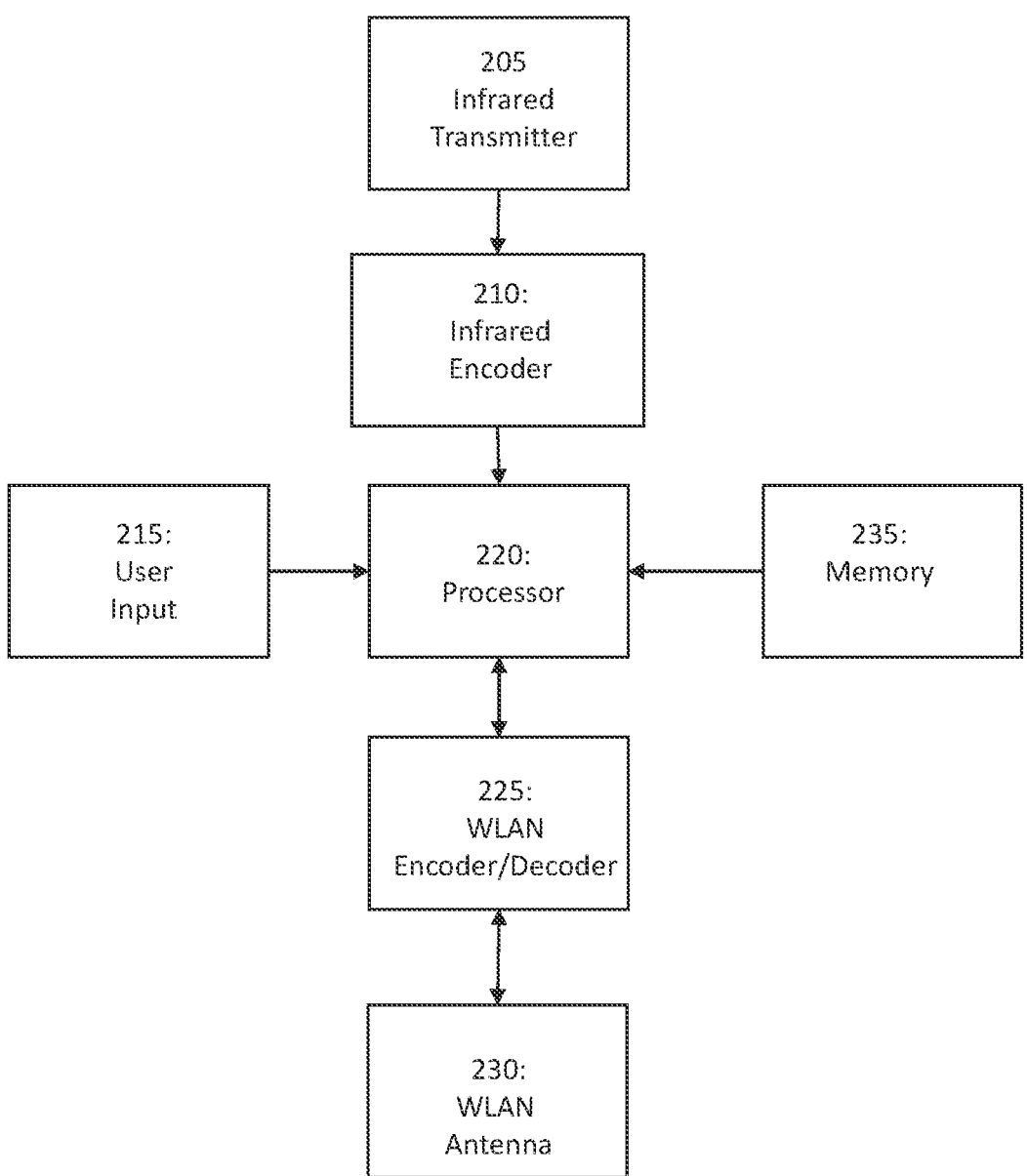
FIG. 3 shows a block diagram illustrating a system for remote controlling an audio/video program for display on a video device according to an exemplary embodiment of the present disclosure.

Turning now to FIG. 3, an exemplary system 200 for remote controlling an audio/video program for display on a video device according to an exemplary embodiment of the present disclosure is shown. The exemplary system 200 may be a remote control and may include an infrared transmitter 205, an infrared encoder 210, a processor 220

The processor 220 is configured to receive an input signal from the user input 215 in response to a user action. For example, the user input 215 may be a keypad and the input signal may be generated in response to a user pressing a particular button on the keypad. The processor 220 is then configured to determine if the input signal corresponds to a command to be transmitted directly to a display device performing an associated application algorithm, if the input signal corresponds to a command to be transmitted to the display device via a network interface, or if the input signal corresponds to a command to be transmitted to a backend server or the like for control of the streaming of an audio/video program or request for data to be transmitted via the streaming transmission channel. Alternatively, the input signal command may be transmitted to the backend server for translation of the remote control command to a command suitable for the current application.

If the processor 220 determines that the input signal corresponds to a command to be transmitted via the router to the display device directly or to the back end server, the processor 220 generates a control signal corresponding to the input signal and couples this control signal to the infrared encoder 210. While the present embodiment is described with respect to an infrared transmission format, the transmission format for transmitting data directly to the display device may be any conventional remote control transmission format, such as radio frequency, light pulse or Bluetooth® wireless technology standard. In this example, the infrared encoder 210 receives the control signal from the processor 220 and encodes the control signal for transmission via the infrared transmitter 205. The control signal may be modulated according to a format corresponding to a receiver format used by the display device, such as 38 kHz modulation, or the like. In one exemplary embodiment the infrared transmitter 205 may be an infrared light emitting diode (LED).

If the processor 220 determines that the input signal corresponds to a command to be transmitted via the router or the back end server the processor 200 generates a control signal with the appropriate destination address, such as an Internet Protocol address, corresponding to the desired destination. The processor 220 may then be configured to couple the control signal to a wireless LAN encoder/decoder 225 for encoding for transmission via a wireless network. The encoded control signal is then coupled from the wireless LAN encoder/decoder 225 to a wireless LAN antenna or the like for transmission via the wireless network.

In some exemplary embodiments, memory 235 may be electrically connected to the processor 220 for storing information related to the various user inputs and destinations associated with the corresponding control signals. In addition the memory 235 may store remote control codes for various display devices configuration and/or information related to the remote controller, network addresses for associated devices and/or network configuration information associated with a wireless network.

Figure 4:
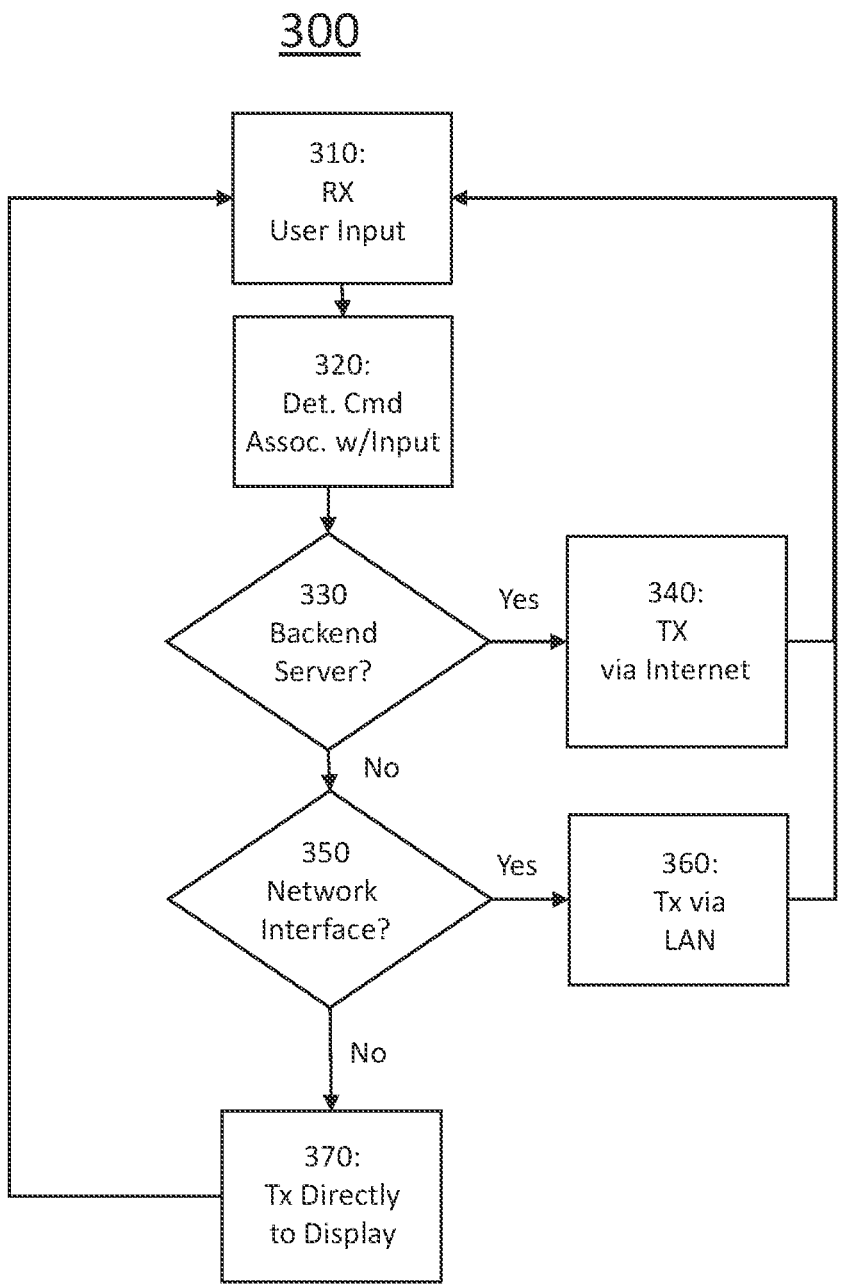
FIG. 4 shows a flowchart illustrating a method for remote controlling an audio/video program on a video device according to an exemplary embodiment of the present disclosure.

Turning now to FIG. 4, a method 300 for remote controlling an audio/video program for display on a display device according to an exemplary embodiment of the present disclosure is shown. The exemplary method is first configured for receiving 310 a user input from a user input device such as a keypad touch pad or gesture translation device integrated into a remote control device. The user input may be associated with a command applicable to an application algorithm running on a display device. In some exemplary embodiments the application algorithm may display an audio/video program being streamed from a back end server via a wide area network, such as the Internet.

The method is next configured to determine 320 a destination associated with the user input. The method may determine the destination in response to data such as a lookup table stored on a memory integrated into the remote controller. In some exemplary embodiments destinations may include the display device, a local area network interface on the display device, and or a server located on a wide area network, such as the Internet.

If the method determines 330 destination associated with the user input is a server such as a back-end server, the method generates a data packet including data associated with the user input and data indicative of a network address or other location of the destination server, formats this data packet for transmission via the wide area network, and transmits the data packet to the destination via the wide area network. The method next returns to receive 310 a subsequent user input.

If the destination associated with the user input is not determined to be a back-end server or the like, the method next determines 350 if the user input should be coupled to the display device via a network interface. Next, the method determines that the control signal should be coupled to the display device via a network interface. The method next generates an appropriately formatted data packet for transmission via the local area network including the data associated with the user input and the destination of the data packet. The method is next operative to transmit 360 the data packet to the destination via the local area network. The method next returns to receive 310 a subsequent user input.

If the method determines user input should not be transmitted to a network interface or back-end server, the method next configures 370 the control signal to be transmitted directly to the display via a conventional remote control transmission channel such as infrared or a radio frequency transmission channel. The method next returns to receive 310 a subsequent user input.

Figure 5:
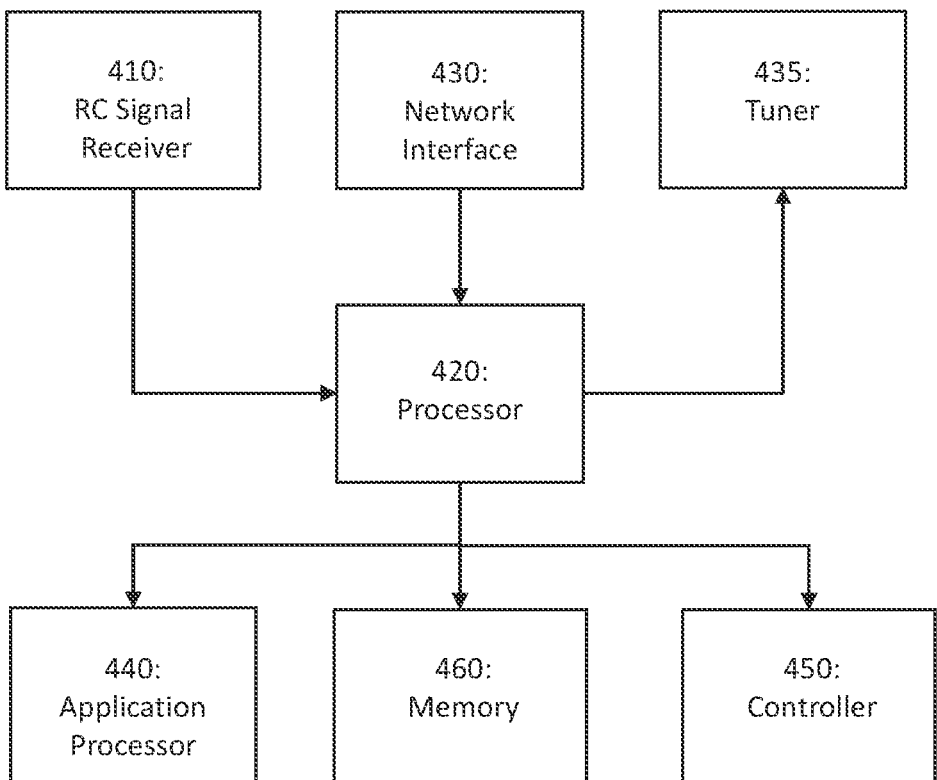
FIG. 5 shows a block diagram illustrating a system for remote controlling an audio/video program on a video device according to another exemplary embodiment of the present disclosure.

Turning now to FIG. 5, a system 400 for controlling an audio/video program for display on a video device according to an exemplary embodiment of the present disclosure is shown. In this exemplary embodiment, the system 400 may be integral to a video display device and may include a remote control signal receiver 410, a network interface 430, a tuner 435, a processor 420, an application processor 440, a memory 460, and a controller 450.

The remote control signal receiver 410 may be an infrared receiver, a radio frequency receiver or the like for receiving control signals transmitted by a remote control. The control signals may be associated with features associated with the display device, such as volume control or picture brightness, or may be associated with an application being performed by an applications processor 440, such as a streaming video application. The processor 420 is coupled to the remote control signal receiver 410 and is configured to determine a process associated with the control signal. If the process is associated with the display device, the processor 420 may couple the control signal, or data related to the control signal, to a controller 450. If the processor is associated with an application, the processor 420 may couple the control signal to the application processor 440.

The network interface 430 may be coupled to a local area network, such as a Wi-Fi® network, for transmitting and receiving data via the local area network. In some exemplary embodiments, the network interface 430 may be configured for receiving control signals associated with an application algorithm being performed by the application processor. The network interface 430 is configured to couple the received control signal to the processor 420. The processor 420 then determines if the received control signal is associated with an application being performed by the application processor 440. If the control signal is associated with an application being performed by the application processor 440, the processor 420 then couples the control signal to the application processor 440. The network interface may be further configured for receiving audio/video program data, such as streaming video programs, gaming control data, or other information or entertainment data. The processor 420 may be configured for decoding this received program data, for coupling the program data to the application processor 440 or for storing the program data in a memory 460.

The tuner 435 may be configured for receiving program data via a transmission channel, such as a satellite transmission, radio frequency broadcast transmission, and/or a wired video content source, such as a cable television network. The tuner 435 may further be configured for receiving control data transmitted from a service provider via the transmission channel. The control data may include instructions or control data associated with an application being performed by the applications processor 440. The tuner 435 may then decode the control data, couple the decoded control data to the processor 420 wherein the processor 420 then couples the control data to the application processor 440.

The application processor 440 is configured to receive the control data related to the application from the processor 420. The application processor 440 is then configured to control the application in response to the control data. For example, the application processor 440 may jump to a previous time point in a streaming audio/video program in response to the control data, may pause a video program, or may activate a menu system. The application 440 may transmit data to the backend server via the network interface 430 to request control of the streaming audio/video program or other data. In some exemplary embodiments, the application processor 440 may couple player data in a gaming application to the network interface 430 to be transmitted to a gaming server. The gaming server may then update data related to an online game and transmit this updated data back to the display device and/or other gaming units.

The controller 450 may be configured to adjust settings related to the operation of the display device, such as volume settings, display settings, network settings and other configuration and control operations associated with the display device. The memory 460 may be configured to store data related to various applications performed by the applications processor 440 as well as settings for the display device, communications protocol data and the like.

Figure 6:
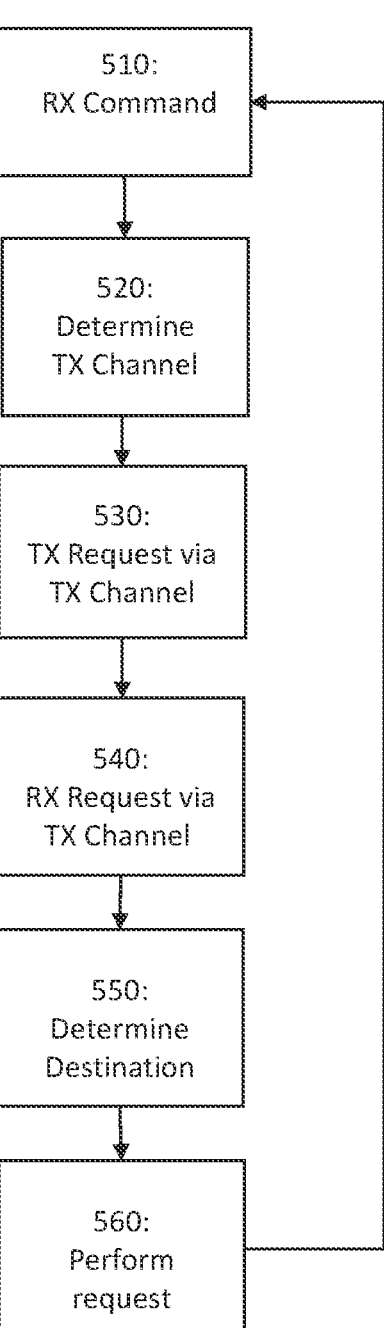
FIG. 6 shows a flowchart illustrating a method for remote controlling an audio/video program on a video device according to another exemplary embodiment of the present disclosure.

Turning now to FIG. 6, a method 500 for remote controlling a display device according to an exemplary embodiment of the present disclosure is shown. The method is first configured to receive 510 a control command at a remote control in response to a user input. The user input may be received in response to a button push, a gesture movement, or a touch pad entry on the remote control. The control command may correspond to a function of an application running on a display device. For example the control command may be a request for a menu display in an audio/video program streaming application.

The method is next operative to determine 520 a transmission channel for coupling the control command to a chosen device. In some instances, the remote control may transmit the control command directly to the display device using conventional remote control transmission channels such as infrared, radio frequency, Bluetooth® or the like. In some instances the display device may not be programmed to decode the control command directly for coupling to the application. In this case the method may determine that the control command must be transmitted via a data network to a network interface in the display device. In one exemplary embodiment the data network may be a wireless data network for transmitting data to a wireless router and wherein the display device is similarly coupled to the wireless router.

After determining the required transmission channel the method next formats 530 the control command into a data packet appropriate for transmission via the required transmission channel. The data packet may further include a network address for the display device or a network address for a back end server wherein the back end server provides an audio/video program to the display device. In some embodiments the data network maybe further coupled to an outside data network, such as the Internet, for coupling the control command to the back end server.

At the display device, the method is next configured for receiving 540 the control request from the remote control. The control command may be received add a network interface integral to the display device and coupled to the data network, any tuner for receiving the audio/video program, or a remote control interface such as an infrared receiver. The method then determines the destination for the control command in response to data within a data packet, in response to a network address, or in response to the nature of the control command. Finally, the control command may be coupled to an application algorithm being performed by the display device. In the exemplary embodiment the algorithm may then initiate a display of the requested menu in the audio/video streaming application. The method then returns to waiting to receive 510 a subsequent user input at the remote control.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the disclosure in any way. To the contrary, various changes may be made in the function and arrangement of the various features described herein without departing from the scope of the claims and their legal equivalents.

The invention claimed is:

1. A method of controlling an application running on a display device comprising:

receiving a first user input via a user interface and on a remote control;

generating a first control signal in response to the first user input indicating a command for the application;

determining a network transmission channel for the first control signal in response to the first control signal including the command for the application, the network transmission channel configured to route the first control signal to a remote server that is remote from a local area network (LAN) of the display device;

transmitting, over the network transmission channel, the first control signal to the remote server, wherein the remote server reconfigures the first control signal to generate an application-specific control signal, wherein the remote server returns the application-specific control signal to a network interface of the display device via the network transmission channel, wherein the application-specific control signal causes the application running on the display device to implement the command mapped to the first user input for the application, wherein the application is operative to transmit a request to a provider to control an audio/video stream received by the display device;

receiving a second user input via the user interface and on the remote control;

generating a second control signal in response to the second user input;

determining a wireless transmission channel for the second control signal in response to the second control signal including a direct command for the display device; and transmitting, by an infrared transmitter of the remote control, the second control signal directly to a wireless receiver of the display device, wherein the wireless transmission channel is an infrared transmission channel.

2. The method of claim 1, further including:

formatting the first control signal for transmission to a network server to generate a network data packet; and transmitting the network data packet to the remote server via the network interface.

3. The method of claim 1, wherein the first control signal includes data for controlling the application.

4. The method of claim 1, wherein the second control signal includes data for controlling the display device.

5. The method of claim 1, wherein at least one of the first control signal and the second control signal initiates installation of the application on the display device.

6. A remote control device comprising:

a radio frequency transmitter configured to transmit a first control command directly to a display device over a radio communication channel in response to the first control command including a direct command for the display device;

a network interface of the remote control device configured to transmit a second control command to a remote server over a network transmission channel, wherein the network transmission channel is configured to route the first control command to the remote server that is remote from a local area network (LAN) of the display device, wherein the remote server reconfigures the second control command to generate an application-specific control signal, wherein the remote server transmits the application-specific control signal to a network interface of the display device to implement an action in an application running on the display device, wherein the application-specific control signal is mapped to the second control command, and wherein the application is operative to transmit a request to a provider to control an audio/video stream received by the display device;

a user interface configured to receive a first user input including the first control command and a second user input including the second control command; and a processor configured to generate the first control command in response to the first user input calling for control of the display device, the processor further configured to generate the second control command in response to the second user input calling for control of the application running on the display device.

7. A method of controlling an application on a display device comprising:

receiving a first user input via a user interface and on a remote control;

generating a first control signal in response to the first user input;

determining a network transmission channel for the first control signal in response to the first control signal including a command for the application, the network transmission channel configured to route the first control signal to a remote server that is remote from a local area network (LAN) of the display device;

transmitting, over the network transmission channel, the first control signal to the remote server, wherein the remote server reconfigures the first control signal to generate an application-specific control signal, wherein the remote server returns the application-specific control signal to the display device over the network transmission channel, wherein the application-specific control signal causes the application running on the display device to implement the command mapped to the first user input for the application, and wherein the application is operative to transmit a request to a provider to control an audio/video stream received by the display device;

receiving a second user input via the user interface and on the remote control;

generating a second control signal in response to the second user input;

determining a radio transmission channel for the second control signal in response to the second control signal including a direct command for the display device; and transmitting, by a radio transmitter, the second control signal directly to a wireless receiver of the display device.

8. The method of claim 7, further including:

formatting the first control signal for transmission to a network server to generate a network data packet; and transmitting the network data packet to the remote server via network interface.

9. The method of claim 7, wherein the first control signal includes data for controlling the application.

10. The method of claim 7, wherein the second control signal includes data for controlling the display device.

11. The method of claim 7, wherein at least one of the first control signal and the second control signal initiates installation of the application on the display device.

\* \* \* \* \*